United States Patent
Patwardhan (10) Patent No.: US 9,989,956 B2
(45) Date of Patent: Jun. 5, 2018

(54) SPLIT RANGE CONTROL USING PROPORTIONAL-INTEGRAL CONTROL WITH FLOW VALVES

(71) Applicant: Saudi Arabian Oil Company, Dhahran (SA)

(72) Inventor: Rohit Patwardhan, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 129 days.

(21) Appl. No.: 15/152,350

(22) Filed: May 11, 2016

(65) Prior Publication Data

US 2017/0329310 A1 Nov. 16, 2017

(51) Int. Cl.
G05B 19/416 (2006.01)
F17D 1/00 (2006.01)
F17D 3/01 (2006.01)
F17D 3/14 (2006.01)

(52) U.S. Cl.
CPC ........... *G05B 19/416* (2013.01); *F17D 1/005* (2013.01); *F17D 3/01* (2013.01); *F17D 3/14* (2013.01); *G05B 2219/37371* (2013.01)

(58) Field of Classification Search
None
See application file for complete search history.

(56) References Cited

U.S. PATENT DOCUMENTS

| | | | |
|---|---|---|---|
| 5,298,845 A | 3/1994 | DoBoer et al. | |
| 5,960,624 A * | 10/1999 | Blotenberg | F02C 9/18 60/39.25 |
| 7,142,626 B2 | 11/2006 | Cheng | |
| 7,603,186 B2 | 10/2009 | Smirnov | |
| 7,890,198 B1 | 2/2011 | Gahinet | |
| 2010/0301170 A1 | 12/2010 | Boseroy et al. | |
| 2011/0301724 A1* | 12/2011 | Tondolo | G05B 11/42 700/42 |
| 2012/0282111 A1 | 11/2012 | Nip et al. | |
| 2012/0318526 A1 | 12/2012 | Dykstra et al. | |
| 2014/0166117 A1 | 6/2014 | Lind | |
| 2015/0134084 A1 | 5/2015 | Pakianathan | |

OTHER PUBLICATIONS

International Search Report and Written Opinion of the International Searching Authority issued in International pplication No. PCT/US2017/019027 dated Jun. 1, 2017; 10 pages.
Contek Systems Ltd, "Split Range Control," published in Sep. 2006, 3 pages. http://www.contek-systems.co.uk/Documents/Split%20range%20controllers.pdf.
Vilanova et al, "PID Control in the Third Millennium," copyright 2012, 1 page.

* cited by examiner

*Primary Examiner* — Dennis M Butler
(74) *Attorney, Agent, or Firm* — Fish & Richardson P.C.

(57) ABSTRACT

Example computer-implemented methods, apparatuses, and systems are described for implementing split range control using Proportional-Integral (PI) control on a process. In some aspects, a feedback signal from the process is received. A proportional control is performed on the feedback signal to generate a first control output while an integral control is performed on the feedback signal to generate a second control output. A first valve of the process is controlled based on the first control output while a second valve of the process is controlled based on the second control output. The second valve has a valve diameter larger than a valve diameter of the first valve.

21 Claims, 7 Drawing Sheets

Table 1: Tuning for LIC 1 and LIC 2

| Tag | Control | Action | P | I |
|---|---|---|---|---|
| LIC 1 | Small 4" valve | Old | $K_p$ | $K_i$ |
| | | New | $K_{p1} < K_p$ | $K_{i1} = 100 * K_i$ |
| LIC 2 | Big 12" valve | Old | $K_p$ | $K_i$ |
| | | New | $K_{p2} > K_p$ | $K_{i2} > K_i$ |

Table 2: Process improvments – Standard deviation before vs after

| Dehydrator Drum | Before | After | Change |
|---|---|---|---|
| Interface Level (.PV) | 4.041 | 1.898 | -53.03 % |
| LIC 1 (.OP) | 13.24 | 7.723 | -41.67 % |
| LIC 2 (.OP) | 5.543 | 2.164 | -60.96 % |

FIG. 7

SPLIT RANGE CONTROL USING PROPORTIONAL-INTEGRAL CONTROL WITH FLOW VALVES

TECHNICAL FIELD

This disclosure relates to implementing split range control using Proportional-Integral (PI) control with a big valve and a small valve.

BACKGROUND

Valves control flow through flow paths, such as pipes. Wellbores include several such flow paths, and as a result valves can be used to control flow paths in wells. In split range control, output of a controller is split and sent to more than one valves of a process (for example, a plant, a system) to control a process variable. A single-input single-output (SISO) Proportional-Integral (PI) controller can control only one valve at any given time due to the single input single output nature of the PI control algorithm. The single-output of the PI controller can be directed to the most appropriate valve when used for split range control.

SUMMARY

This disclosure describes methods, systems, and apparatus for implementing split range control using Proportional-Integral (PI) control on a process. For example, the process can include a flow control process controlled by a big valve and a small valve configuration. In some implementations, as described below, the Proportional (P) part of the control action can be directed to the small valve for quick response to fast acting disturbances in the flow and the Integral (I) part of the control action can be directed to the big valve for steady state response to large disturbances in the flow.

One example method includes receiving a feedback signal in response to executing fluid flow control on a fluid flow process through a pipe system; performing a proportional control on the feedback signal to generate a first control output, the proportional control generating the first control output substantially proportional to a magnitude of the feedback signal; performing an integral control on the feedback signal to generate a second control output, the integral control generating the second control output substantially proportional to the magnitude of the feedback signal and a duration of the feedback signal; controlling a first valve of the pipe system based on the first control output; and controlling a second valve of the pipe system based on the second control output, the second valve having a valve diameter larger than a valve diameter of the first valve.

This, and other aspects, can include one or more of the following features. The proportional control on the feedback signal is performed substantially simultaneously with the integral control on the feedback signal. The first valve of the pipe system is controlled based on the first control output substantially simultaneously with the second valve of the pipe system based on the second control output. Receiving the feedback signal, performing the proportional control, performing the integral control, controlling the first valve, and controlling the second valve are performed automatically by a single-input two-output (SITO) Proportional-Integral (PI) controller. The SITO PI controller is configured to control the first valve and the second valve substantially simultaneously to execute the fluid flow control on the fluid flow process through the pipe system.

In some aspects, performing the proportional control and controlling the first valve are performed automatically by a first single-input single-output (SISO) PI controller, and performing the integral control and controlling the second valve are performed automatically by a second SISO PI controller different than the first SISO PI controller.

In some aspects, the fluid flow process is a gas oil separation process (GOSP). Executing fluid flow control on the GOSP controls an interface level between oil and water in a dehydrator drum of the GOSP. The first valve and the second valve are air-to-close type valves controlling a water flow rate of the GOSP. The feedback signal is an input of the SITO PI controller representing a difference between a predetermined set point and the interface level between oil and water in the dehydrator drum of the GOS. The predetermined set point is a target value for the interface level between oil and water in the dehydrator drum of the GOSP.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, a controller includes a proportional control component and an integral control component. The proportional control component can receive a feedback signal from a process, perform a proportional control on the feedback signal to generate a first control output, and control a first actuator of the process based on the first control output. The proportional control generates the first control output substantially proportional to a magnitude of the feedback signal. The integral control component can receive the feedback signal in response to executing the process, perform an integral control on the feedback signal to generate a second control output, and control a second actuator of the process based on the second control output. The integral control generates the second control output substantially proportional to the magnitude of the feedback signal and a duration of the feedback signal.

This, and other aspects, can include one or more of the following features. The controller is a single-input two-output (SITO) Proportional-Integral (PI) controller.

In some aspects, the controller includes a first and a second single-input single-output (SISO) PI controllers. The proportional control component includes the first SISO PI controller having a first set of parameters, and the integral control component includes the second SISO PI controller having a second set of parameters different than the first set of parameters. Each set of parameters includes at least two of a proportional gain, an integral gain, or integral time.

In some aspects, the first SISO PI controller has an integral component that is disabled or has a parameter associated with integral time of the integral component that is set to a maximum allowed value in the first SISO PI controller.

In some aspects, the first actuator and the second actuator are air-to-close type valves. The second actuator has a valve diameter larger than a valve diameter of the first actuator.

In some aspects, the process is a gas oil separation process (GOSP). The controller controls an interface level between oil and water in a dehydrator drum of the GOSP. The first actuator and the second actuator control a water flow rate of the GOSP.

In some aspects, the feedback signal is an input of the controller representing a difference between a predetermined set point and the interface level between oil and water in the dehydrator drum of the GOSP. The predetermined set point is a target value for the interface level between oil and water in the dehydrator drum of the GOSP.

One example system includes a process and a controller connected to the process in a feedback loop. The process includes a first actuator and a second actuator. Each of the first actuator and the second actuator controls an output of the process. The controller can receive, from the process, a feedback signal associated with the output of the process; perform a proportional control on the feedback signal to generate a first control output, the proportional control generating the first control output substantially proportional to a magnitude of the feedback signal; perform an integral control on the feedback signal to generate a second control output, the integral control generating the second control output substantially proportional to the magnitude of the feedback signal and a duration of the feedback signal; control the first actuator of the process based on the first control output; and control the second actuator of the process based on the second control output.

This, and other aspects, can include one or more of the following features. The proportional control on the feedback signal is performed substantially simultaneously with the integral control on the feedback signal.

In some aspects, the controller is a single-input two-output (SITO) Proportional-Integral (PI) controller.

In some aspects, the controller includes a first single-input single-output (SISO) PI controller having a first set of parameters performing the proportional control on the feedback signal and a second SISO PI controller having a second set of parameters different than the first set of parameters performing the integral control on the feedback signal. Each set of parameters includes at least two of a proportional gain, an integral gain, or integral time.

In some aspects, the first actuator and the second actuator are air-to-close type valves. The second actuator has a valve diameter larger than a valve diameter of the first actuator.

In some aspects, the process is a gas oil separation process (GOSP). The controller controls an interface level between oil and water in a dehydrator drum of the GOSP. The first actuator and the second actuator control a water flow rate of the GOSP.

In some aspects, the feedback signal is an input of the controller representing a difference between a predetermined set point and the interface level between oil and water in the dehydrator drum of the GOSP. The predetermined set point is a target value for the interface level between oil and water in the dehydrator drum of the GOSP.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description in the following. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

This disclosure relates to methods, systems, and apparatus for implementing split range control using Proportional-Integral (PI) control on a process (for example, a chemical refinery process) with a big valve (for example, valve with a large valve diameter) and a small valve (for example, valve with a small valve diameter smaller than the large valve diameter) configuration. For example, the Proportional (P) action of a PI controller is independently directed to the small valve for quick response to fast acting disturbances (for example, disturbances having high frequency and low amplitude) and the Integral (I) action of the PI controller is independently directed to the big valve for steady state response to large disturbances (for example, disturbances having lower frequency and higher amplitude than the fast acting disturbances). Although this disclosure refers to a process with a big valve and a small valve configuration for purposes of example, the subject matter of this document can be applied to other processes that have more than one actuator available to control a process variable.

In split range control, output of a controller is split and sent to more than one valve of a process (for example, a plant, a system) to control a process variable. Common applications of split range control schemes are pressure control schemes, where an inline valve and a flare valve are used to ensure that the system does not get over or under pressurized. In some cases, a big valve and a small valve arrangement is also used to use the small valve for fine (or trim) control and the big valve to handle large disturbances. A single-input single-output (SISO) PI controller can control only one valve at any given time due to the single input single output nature of the PI control algorithm. The single-output of the PI controller can be directed to the most appropriate valve when used for split range control. For example, if two valves (for example, valve A and valve B) are available, the SISO PI controller will move valve A first till valve A is 100% open (or closed) and then move valve B till valve B is 100% open (or closed).

The disclosed subject matter addresses problems that arise when actions from both valves are required simultaneously or when an action from one of the valves is required before an action from the other of the valves has been completed. For example, for a process with a big valve and a small valve configuration, a large and fast acting disturbance to the process (for example, a Gas Oil Separation Process (GOSP) can experience large and sudden changes in flow due to slugging) would require actions from the big valve and the small valve at the same time. Utilizing a single SISO PI controller that controls a single valve at any given time on the process with a big valve and a small valve configuration limits the ability of a feedback loop to improve process performance in such an environment. Sometimes, utilizing a single SISO PI controller (for example, executing a single input single output PI control algorithm) on the process with a big valve and a small valve configuration can cause infighting between the two valves due to their different sizes and different response time, and consequently cause cycling in the process. In the present disclosure, proportional action and integral action of a standard Proportional-Integral-Derivative (PID) block (or a standard PI block) are separated and independently applied on a small valve and a big valve of a process, respectively. Instead of using PI control to perform single-input single-output control, the present disclosure enables PI algorithms to manipulate two outputs simultaneously. For example, the proportional action ("P action") is directed to the small valve for quick response to fast acting disturbances. The integral action ("I action") is directed to the big valve for steady state response to large disturbances. Implementing split range control using the proposed PI control can keep both valves in control range by having the big valve rejecting steady state disturbances and can co-ordinate between the big valve and the small valve since the control action is calculated by a single control algorithm.

Implementing split range control using the proposed PI control, as described in the present disclosure, is simple to design, analyze and maintain. Traditional linear single loop design and analysis techniques could be used to analyze stability and determine suitable tuning values for the dual control strategy. In addition, the present disclosure provides improved closed loop performance as a result of reduced conflict between the big and the small valves. The big valve can move smoothly and the small valve can handle the fast variations. A two-input single-output process control problem is reduced to a single-input single-output problem for analysis purposes. As a result, closed loop stability can be analyzed using conventional linear system analysis techniques (for example, Root locus, Nyquist, Bode methods). The present disclosure is also applicable to any systems with two inputs and a single output, where previously PI control was considered to be unsuitable due to the SISO nature of the PI control algorithm. The present disclosure can provide PI blocks, where the P-term and I-term are available as independent outputs of the same block, in distributed control system (DCS) environments. The present disclosure can also provide reduced output variability. The big valve can move in a smooth fashion avoiding large jerky movements which may have an impact on downstream units and equipment. Due to the reduced output/valve movements, valve life can be lengthened. The smoothness of the large valve movement also improves the operational stability of the process and allows for optimal operation.

Figure 1:
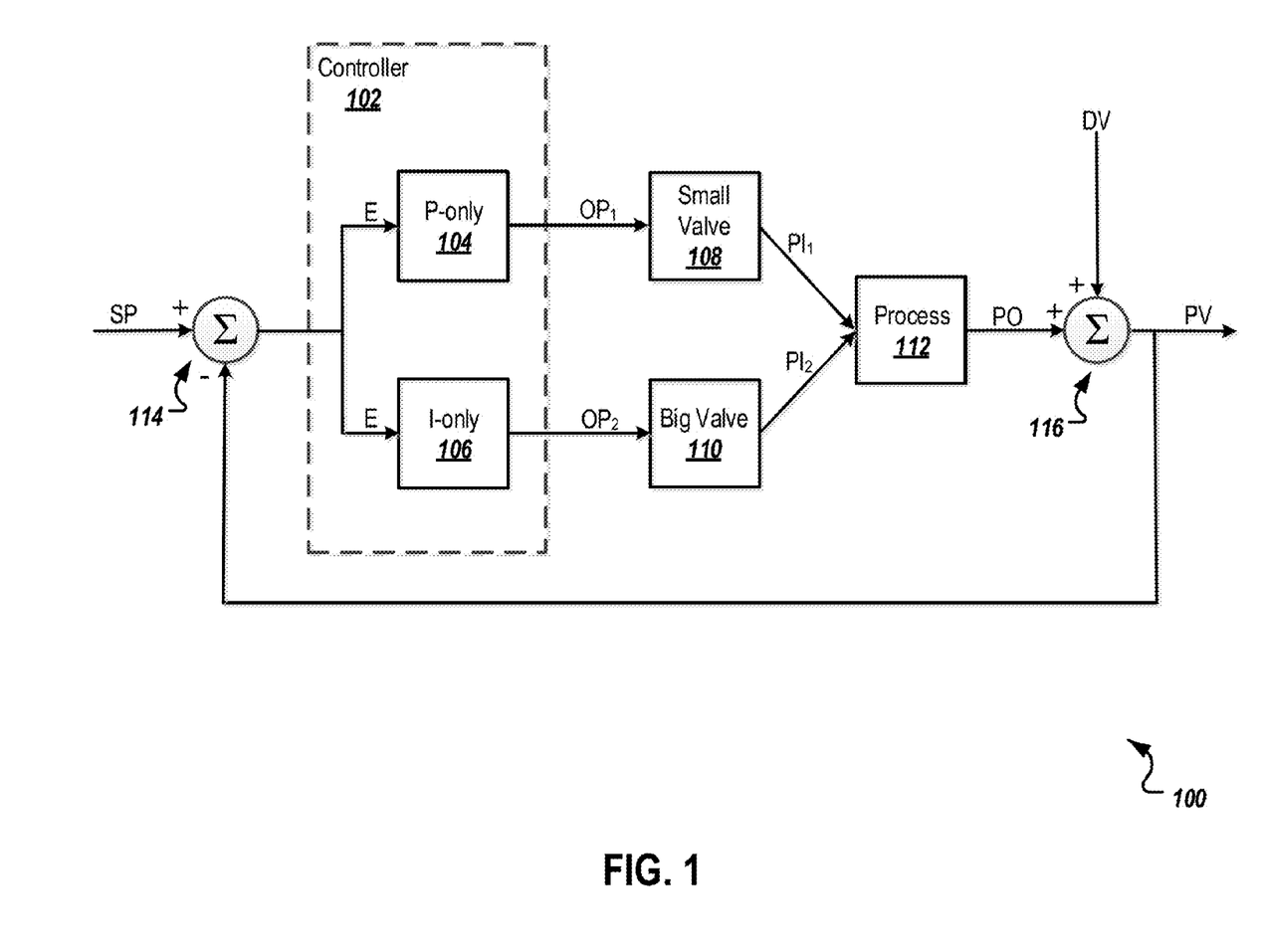
FIG. 1 is a block diagram illustrating an example control system for implementing split range control using Proportional-Integral (PI) control on a process with a big valve and a small valve configuration.

FIG. 1 is a block diagram illustrating an example control system 100 for implementing split range control using Proportional-Integral (PI) control on a process with a big valve and a small valve configuration. As illustrated in FIG. 1, the system 100 includes a single-input two-output (SITO) controller 102, a small valve 108, a big valve 110, a process 112, and signal adders 114, 116. The signals shown in FIG. 1 are as follow:

PV: Process Variable being controlled.
SP: Set Point (or target value for the process variable).
PO: Process Output.
DV: Disturbance.
$OP_1$: Controller Output 1 to control small valve 108.
$OP_2$: Controller Output 2 to control big valve 110.
$PI_1$: Process Input 1.
$PI_2$: Process Input 2.
E: Control Error, E=SP−PV.

As illustrated in FIG. 1, a target value for a controlled process variable (that is, SP) is an input to the system 100. An output value of the process variable (that is, PV) is fed back and subtracted from SP to generate a control error for the process variable (that is, E). The SITO controller 102 takes E as the single input, independently performs P-only 104 action on E to produce a first controller output (that is, $OP_1$), and independently performs I-only 106 action on E to produce a second controller output (that is, $OP_2$) separated from the first controller output. $OP_1$ is applied to small valve 108 only to generate a first process input (that is, $PI_1$). $OP_2$ is applied to big valve 110 only to generate a second process input (that is, $PI_2$). Both process inputs (that is, $PI_1$ and $PI_2$) can affect a process output (that is, PO) and hence cause the PV to be adjusted to within a proper operating range in the presence of process disturbance (that is, DV). As a result, the SITO controller 102 can produce two separate outputs for controlling two valves (that is, directing the P action to the small valve and the I action to the big valve) so that the controlled PV tracks the SP under variations of system dynamics (for example, set point, disturbance, process dynamics).

The SITO controller 102 performs a proportional control by a proportional controller (for example, P-only 104) and an integral control, independent from the proportional control, by an integral controller (for example, I-only 106). In other words, the SITO controller 102 takes a single input and produces two separated controller outputs. In some implementations, one of the two separated controller outputs (outputted by the P-only 104) is substantially proportional to a magnitude of the single input signal and is directed to the small valve 108. The other controller output (outputted by the I-only 106) is substantially proportional to the magnitude of the single input signal and a duration of the single input signal, and is directed to the big valve 110.

The SITO controller 102 can be implemented by modifying a SISO PI controller. Instead of producing a single aggregated proportional and integral controller output, the proportional action and the integral action of the SISO PI controller are separated and independently outputted (discussed in more detail in FIG. 2 later). In some implementations, two independent SISO PI controllers can be used to implement (or emulate) the SITO PI controller. For example, the P-only 104 can be implemented by a first SISO PI controller and the I-only 106 can be implemented by a second SISO PI controller. Both SISO PI controllers receive the same input signal, and each generates a separate output signal. The first SISO PI controller is tuned such that the integral action of the first SISO PI controller is disabled (for example, by setting integral time of the first SISO PI controller to a maximum allowed value in the DCS.) The second SISO PI controller can use I-only control algorithms in the DCS or a standard SISO PI controller in the DCS. In a small valve and a big valve configuration, the output of the second SISO PI controller is directed to the big valve. These proposed schemes leverage the existing DCS infrastructure to implement a two-input single-output control scheme that is commonly found in industry. The implementations of the proposed solutions can be achieved through the standard functionality available in current DCS environments. In future DCS vendors may be able to provide a modified PID block which allows independent direction of its proportional/integral actions to the small/big valves respectively using the ideas proposed in this invention.

As illustrated in FIG. 1, the process 112 is a two-input single-output process with a small valve and a big valve configuration. The process can be a crude oil refinery process, a chemical plant, or an environmental control system. In some implementations, the process 112 can be a multi-input multi-output (MIMO) process or a multi-input single-output (MISO) process. In some implementations, the process 112 can have a different valve configuration (for example, three valve configuration). In some implementations, the process 112 can have other type of actuators (for example, damper).

Figure 2:
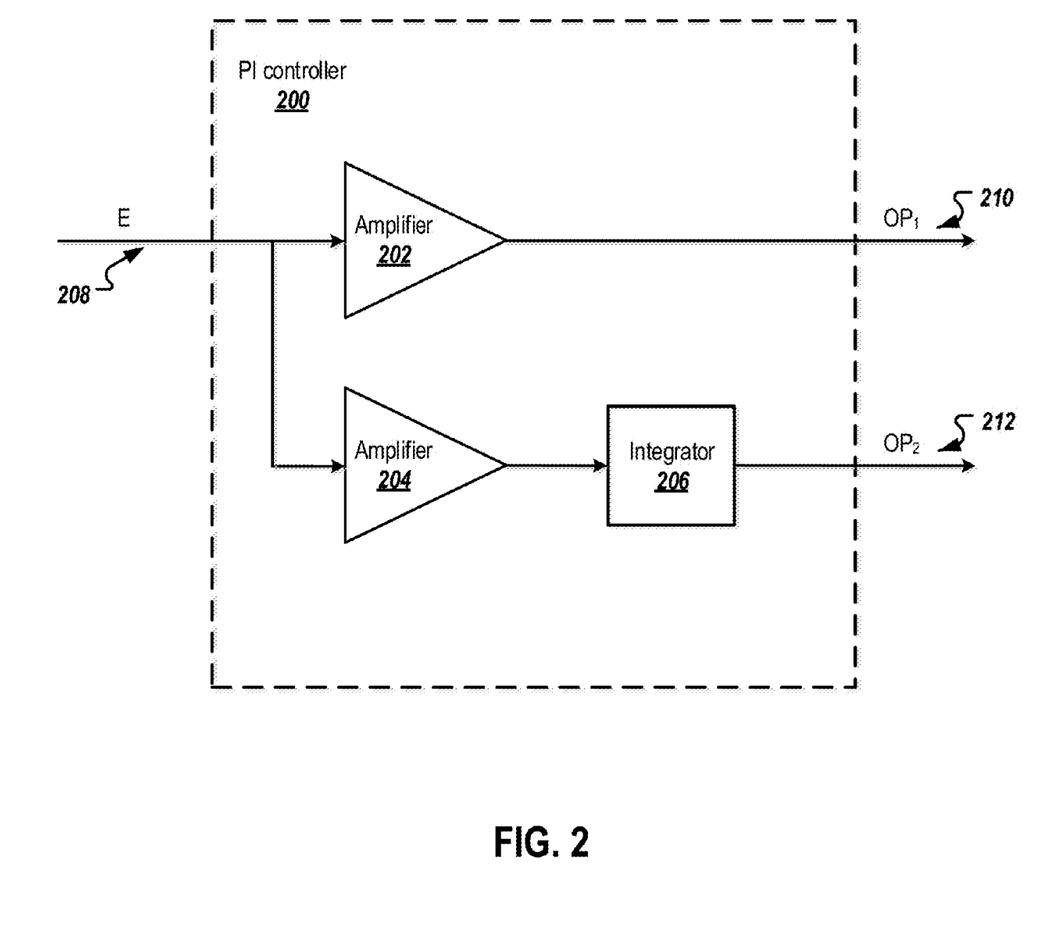
FIG. 2 is a block diagram of an example PI controller for implementing split range control.

FIG. 2 is a block diagram of an example PI controller 200 for implementing split range control. In some implementations, the controller 200 may include additional and/or different components not shown in the block diagram. Components may also be omitted from the controller 200. The components illustrated in FIG. 2 may be similar to, or different from, those described in FIG. 1.

As illustrated in FIG. 2, the controller 200 includes an amplifier 202, an amplifier 204, and an integrator 206. In operation, the controller 200 receives an input signal 208, and produces two output signals, 210 and 212. The amplifier 202 performs P action on the input signal 208 and produces the output 210 with an output value that is proportional to the input value. The proportional response can be adjusted by multiplying the input value by a constant $K_p$ (that is, the proportional gain) using Equation 1. k is sampling instant or time.

$$OP_1(k)-OP_1(k-1)=K_p*[E(k)-E(k-1)]  \quad \text{(Equation 1)}$$

The amplifier 204 and the integrator 206, together, perform I action on the input signal 208 and produce the output 212 with an output value that is proportional to both the input value and a duration of the input signal 208. The integrator 206 sums the instantaneous error over time and gives the accumulated offset that should have been corrected previously. The amplifier 204 then multiplies the accumulated error by a constant $K_i$ (that is, the integral gain) to produce the integral response using Equation 2. In a small valve and a big valve configuration, the integral response is directed to the big valve.

$$OP_2(k)-OP_2(k-1)=K_i*E(k)  \quad \text{(Equation 2)}$$

The combination of Equation 1 and Equation 1 represents a parallel form of a single PI control algorithm. In some implementations, other forms of the single PI control algorithm (for example, an idea form shown in Equation 3) can be used to split the proportional part and the integral part for implementing split range control. $K_c$ is controller gain and $T_i$ is integral time.

$$OP(k)-OP(k-1)=K_c*[E(k)-E(k-1)]+(K_c/T_i)*E(k)  \quad \text{(Equation 3)}$$

As illustrated in FIG. 2, the SITO PI controller 200 takes a single input, performs proportional control and integral control calculations on the single input, and produces two separated controller outputs (that is, a proportional controller output and an integral controller output). Instead of producing a single aggregated proportional and integral controller output and directing the single aggregated output to a single actuator (for example, a single valve) as in a standard SISO PI controller, the SITO PI controller 200 can direct two controller outputs to two actuators of a process (for example, the proportional controller output to a small valve and the integral controller output to a big valve). Since the control action of the SITO PI controller is calculated by a single PI algorithm (for example, as if the SITO PI controller is moving a single valve), using the SITO PI control to implement split range control on a process with a small valve and a big valve configuration results in the co-ordination between the small valve and the big valve. From the perspective of the SITO PI controller, the SITO PI controller calculates a single change which are split up and directed to respective valves. As a result, classical single loop theory can be used to design and analyze the proposed control scheme and also to tune control parameters of the SITO PI controller (for example, $K_p$, $K_i$).

Figure 3:
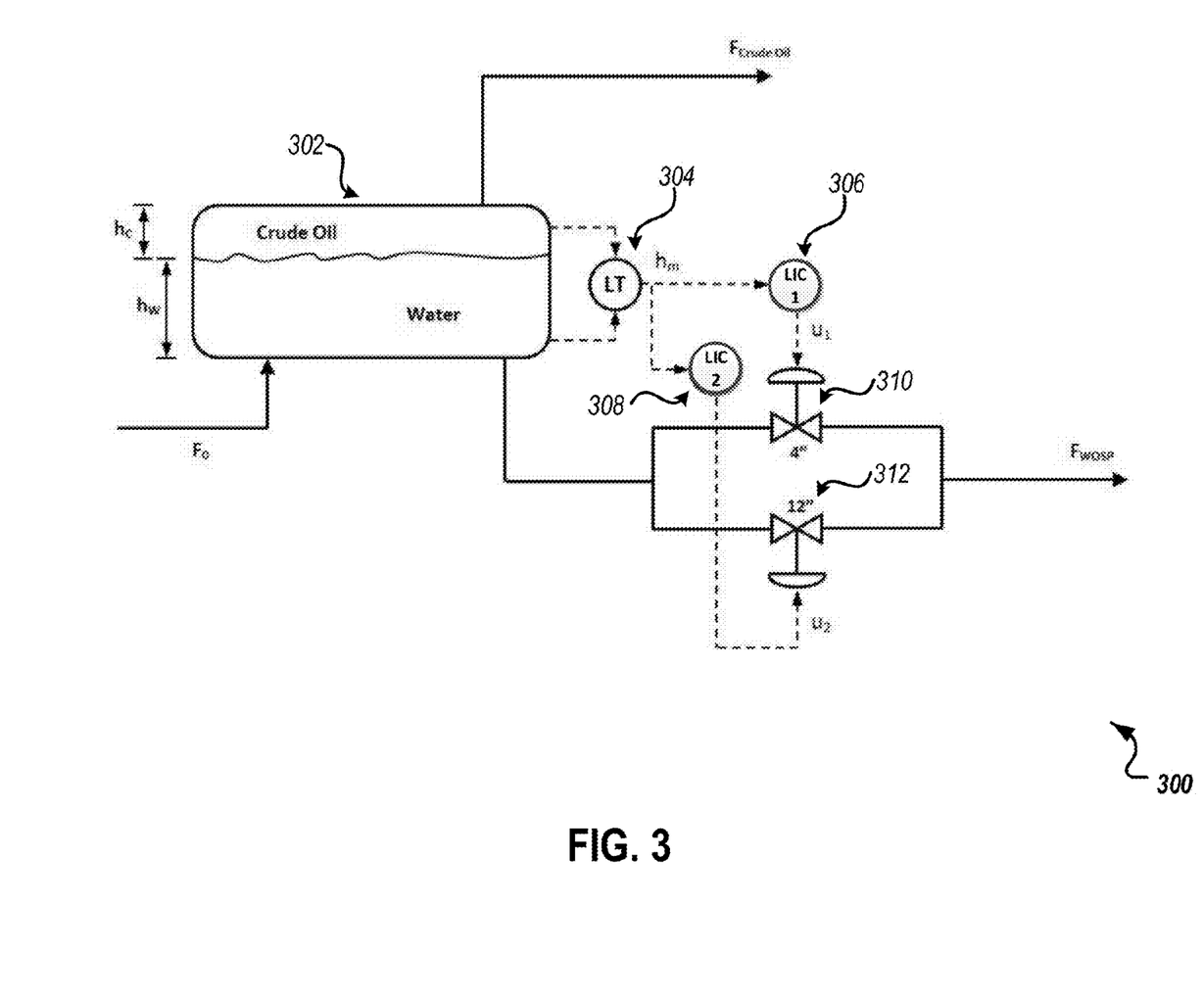
FIG. 3 is a block diagram illustrating an example dehydrator drum level control system with a big valve and a small valve configuration.

FIG. 3 is a block diagram illustrating an example dehydrator drum level control system 300 with a big valve and a small valve configuration at a gas oil separation plant (GOSP). As illustrated in FIG. 3, the system 300 includes a dehydrator drum 302, a level measurement (LT) 304, two level controllers (LICs) 306 and 308, a small valve 310 and a big valve 312. Wet crude oil feed ($F_0$) enters the dehydrator drum 302. The feed water content has to be lowered in the produced crude oil. The removed water is withdrawn from the bottom of the dehydrator drum 302 and the water flows to the downstream facilities of the GOSP ($F_{WOSP}$). The system 300 minimizes the water content in the wet crude oil leaving the dehydrator drum 302 to be processed in a desalter drum in the downstream facilities of the GOSP. The crude oil flows from the top of the dehydrator drum 302 ($F_{crude\ oil}$) to the desalter drum through water mixing injector valves.

In the dehydrator drum 302, the interface level between oil ($h_c$) and water ($h_w$) is measured by LT 304 and controlled by $LIC_1$ 306 and $LIC_2$ 308 to a desired operating level (for example, at around 45% (volume)). The level control loop of the system 300 includes two control valves to adjust the interface level between oil and water in the dehydrator drum 302. The two control valves vary in size, for example the small valve 310 is a 4" valve while the big valve 312 is a 12" valve. The small valve 310 and the big valve 312 control a water flow rate of the GOSP to adjust the interface level between oil and water in the dehydrator drum 302.

As illustrated in FIG. 3, $LIC_1$ 306 includes a first SISO PI controller and $LIC_2$ 308 includes a second SISO PI controller. Both $LIC_1$ 306 and $LIC_2$ 308 receive the same input signal (that is, interface level error $h_m$), and each generates a separate output signal, $u_1$ and $u_2$, respectively. Traditionally the controllers if tuned independently of each other can lead to conflict and cause both the controllers to be turned off with the operators having to manually make movements in each valve. With the proposed method, the controller parameters of the first SISO PI controller (for example, $K_p$, $K_i$) is tuned such that the first SISO PI controller functions like a P-only controller. The controller parameters of the second SISO PI controller are tuned such that the second SISO PI controller functions like an I-only controller. As a result, P action is applied to the small valve 310 for quick response to fast acting disturbances and I action is applied to the big valve 312 for steady state response to large disturbances. In some implementations, the first SISO PI controller and the second SISO PI controller can be tuned independently based on the parallel PI control algorithm (discussed in FIG. 2 before).

Figure 4:
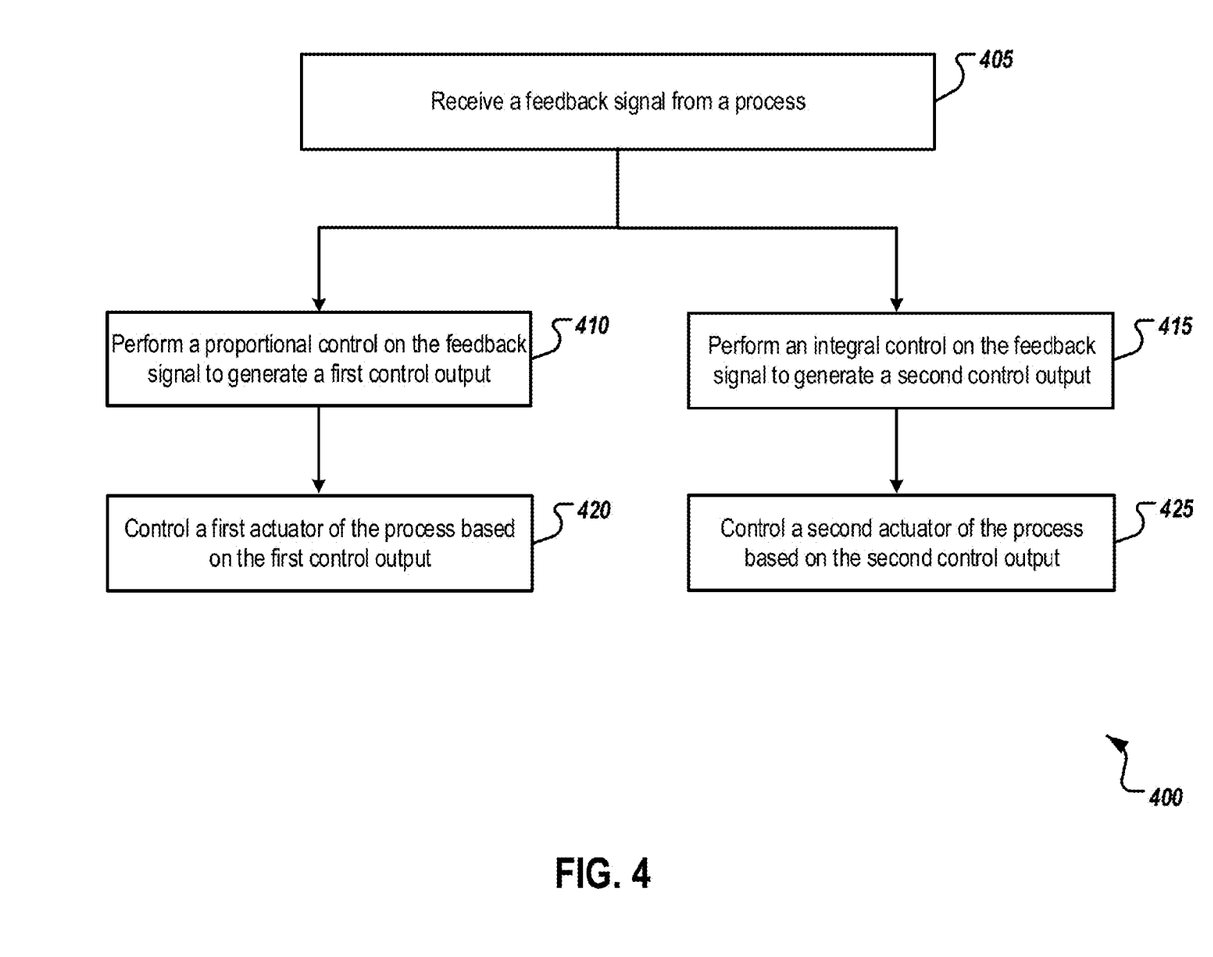
FIG. 4 is a flow chart of an example process for implementing split range control using PI control.

FIG. 4 is a flow chart of an example process 400 for implementing split range control using PI control. The example process 400 can be automatically performed, for example, by any suitable system, environment, software, and hardware, or a combination of systems, environments, software, and hardware, as appropriate. For example, one or more suitable computing devices, such as those described with reference to FIGS. 1-3 can be used to execute process 400. The example process 400 can also be implemented as instructions stored on a non-transitory, computer-readable medium that, when executed by one or more suitable computing devices, configures the one or more suitable computing devices to perform or cause the one or more suitable computing devices to perform the actions of the example process 400 or both.

At 405, a feedback signal from a process is received. The process can be a system or a plant. The feedback signal can be a control error representing a difference between a predetermined set point of a controlled process variable and a current value of the controlled process variable. In some implementations, the feedback signal is received in response to executing fluid flow control on a fluid flow process through a pipe system. Executing fluid flow control includes controlling two actuators of the pipe system. For example, when the fluid flow process is a gas oil separation process (GOSP), executing fluid flow control on the GOSP controls an interface level between oil and water in a dehydrator drum of the GOSP. The two actuators of the GOSP are control valves manipulating a water flow rate of the GOSP. The feedback signal represents a difference between a predetermined set point and the interface level between oil and water in the dehydrator drum of the GOSP. The predetermined set point is a target value for the interface level between oil and water in the dehydrator drum of the GOSP.

At 410, a proportional control action is performed on the feedback signal to generate a first control output. The proportional control generates the first control output substantially proportional to a magnitude of the feedback signal. In some implementations, the proportional control action can be performed by Proportional (P) part of a single-input two-output (SITO) PI controller. In some implementations, the proportional control action can be performed by a first single-input single-output (SISO) PI controller. To provide an approximate proportional control, an integral control action of the first SISO PI controller is disabled (for example, set $K_i=0$) or an integral time parameter of the first SISO PI controller is set to a maximum allowed value (or close to the maximum allowed value) of the first SISO PI controller.

At 415, an integral control action is performed on the feedback signal to generate a second control output. The integral control generates the second control output, substantially proportional to the magnitude of the feedback signal and a duration of the feedback signal. In some implementations, the integral control on the feedback signal is performed simultaneously (or substantially simultaneously) with the proportional control on the feedback signal. In some implementations, the integral control action can be performed by Integral (I) part of the SITO PI controller. In some implementations, the integral control action can be performed by a second SISO PI controller different than the first SISO PI controller. The first SISO PI controller has a first set of parameters to function like a P-only controller, while the second SISO PI controller has a second set of parameters to function like an I-only controller.

At 420, a first actuator of the process is controlled based only on the first control output. At 425, a second actuator of the process is controlled based only on the second control output. In most implementations, the first actuator of the process is controlled based on the first control output simultaneously (or substantially simultaneously) with the second actuator of the process based on the second control output. In some implementations, both actuators are air-to-close type valve. The second actuator (big valve) has a valve diameter larger than a valve diameter of the first actuator (small valve).

Figure 5:
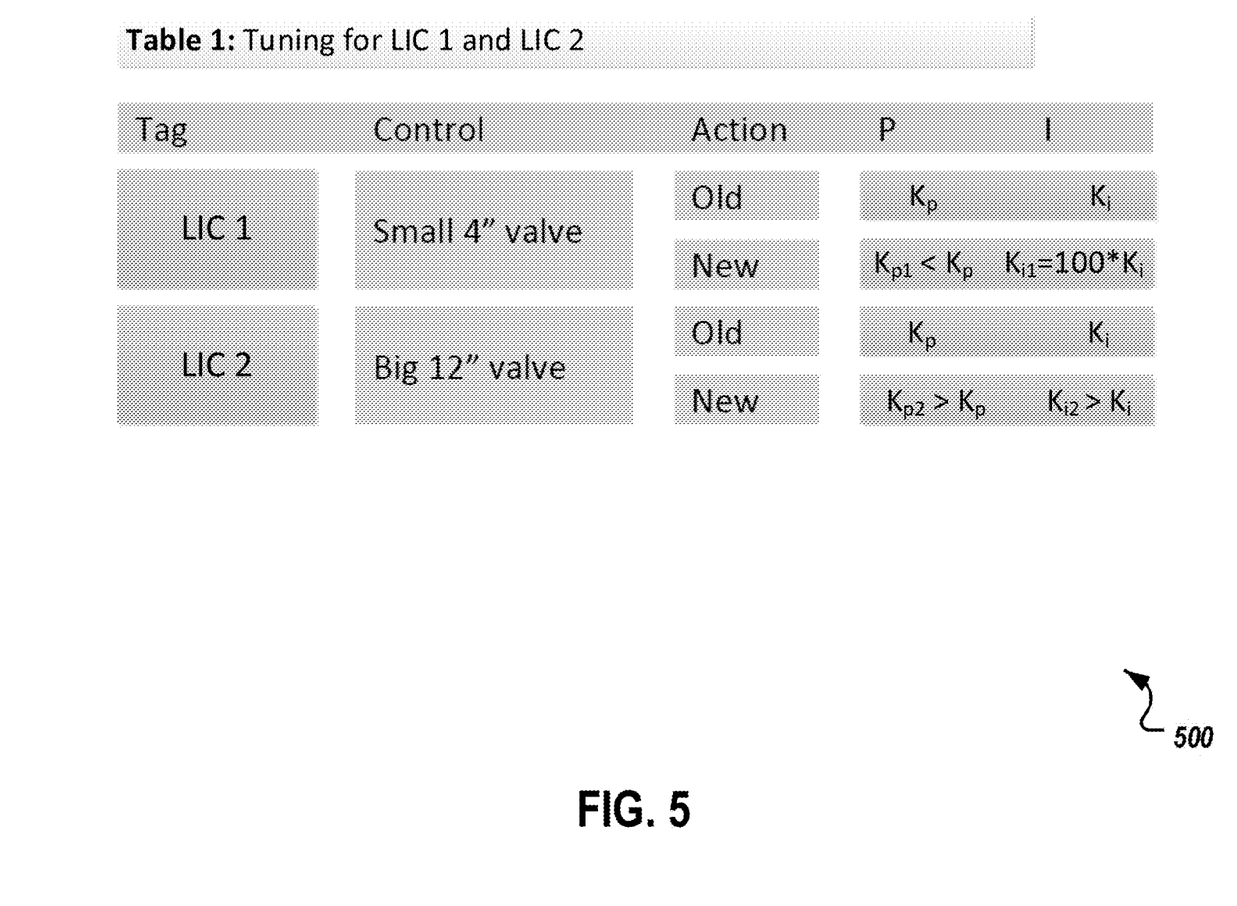
FIG. 5 is a table showing example parameter tuning for controlling a big valve and a small valve using PI control shown in FIG. 3.

FIG. 5 is a table 500 showing example parameter tuning for controlling a big valve and a small valve using PI control shown in FIG. 3. The tuning strategy is to configure the proposed control scheme (discussed in FIG. 3 before) upon which the interaction between the two control valves, 4" and 12" respectively, is decoupled. The configured tuning parameters for the two level control loops are summarized in table 500.

The parameter tuning can be performed independently for the two level control loops. In some implementations, the two level control loops can be tuned one after the other. For example, first choose the P-term based on small valve gain and dynamics. Tune and close the first loop for the P-only controller. The output of the I-only controller goes to the big valve. Next, choose the I-term based on the big valve gain and dynamics. With the process steady and the big valve at a steady position, tune and close the second loop with the I-only (or PI) control action. It is important the first controller have P-only action, and the second controller needs to be predominantly I-action (i.e., some proportional action may be okay). This is necessary to avoid conflict between the two valves.

As illustrated in FIG. 5, the proposed control scheme enables the small valve to be controlled by a predominant P-action controller. The I-action for the small valve is set to a large number $K_{i1}$ (100 times of the old value $K_i$). Conversely, the P-action (proportional band, PB=100/Kc) for the small valve is set to $K_{p1}$ (smaller than the old value $K_p$). A lower proportional band, PB, implies higher proportional action. The P action and I action for the big valve are detuned further: $K_{p2}$ instead of $K_p$ ($K_{p2}>K_p$) and $K_{i2}$ instead of $K_i$ ($K_{i2}>K_i$), respectively.

Figure 6:
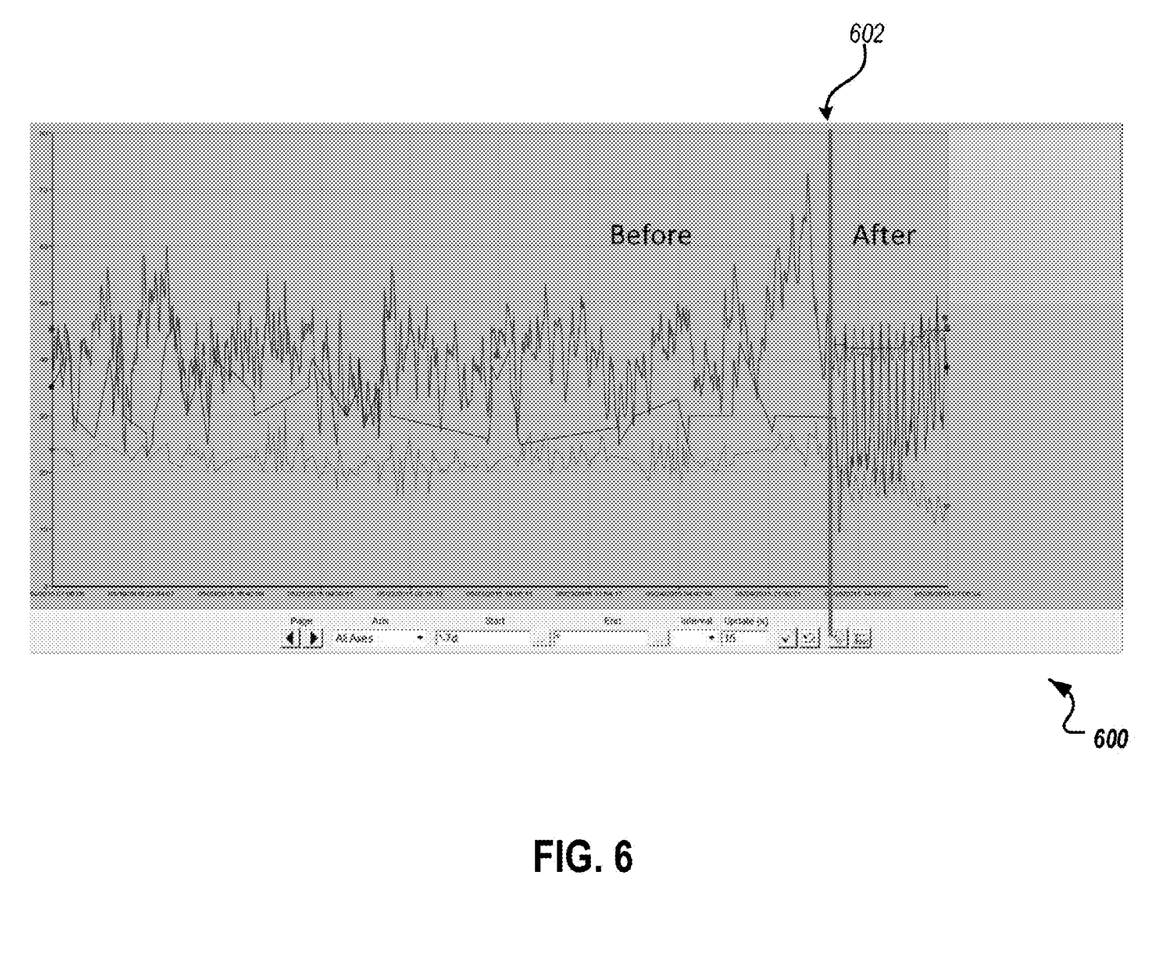
FIG. 6 is a plot showing example level control loops performance before and after implementation of the tuned PI control shown in FIGS. 3 and 5.

FIG. 6 is a plot showing example level control loops performance 600 before and after implementation of the tuned PI control shown in FIGS. 3 and 5. FIG. 6 shows closed loop performance of the proposed method—before and after changes (602).

Figure 7:
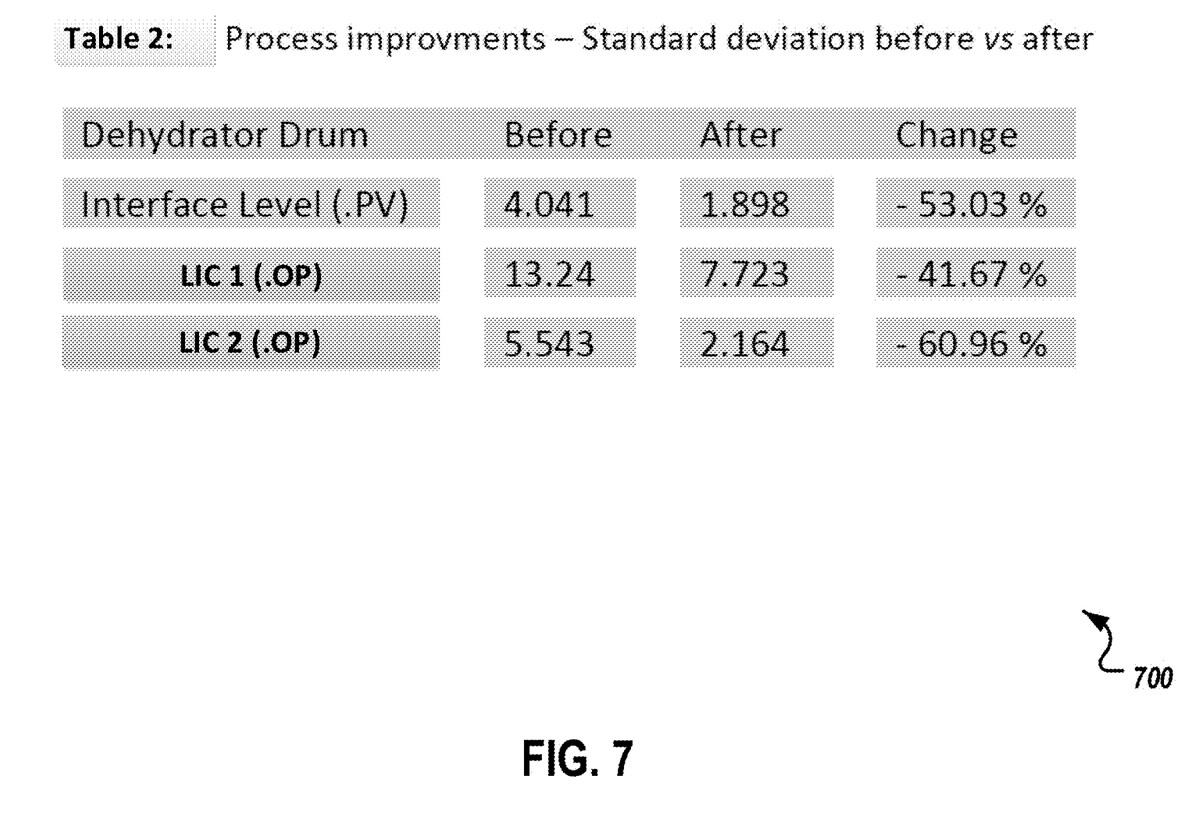
FIG. 7 is a table showing example performance improvement after implementation of the tuned PI control shown in FIGS. 3, 5, and 6.

FIG. 7 is a table 700 showing example performance improvement after implementation of the tuned PI control shown in FIGS. 3, 5, and 6. Table 700 shows performance improvements from the proposed strategy.

The circuitry or controllers or both described in this disclosure can be implemented as hardware, software, firmware, or combinations of them. Alternatively or in addition, the circuitry or the controllers or both can be implemented as electrical circuits. In another alternative, the circuitry or the controllers or both can be implemented as computer-readable media storing instructions executable by computer processors to perform the operations described here.

While this specification contains many specific implementation details, these should not be construed as limitations on the scope of any inventions or of what may be claimed, but rather as descriptions of features specific to particular implementations of particular inventions. Certain features that are described in this specification, in the context of separate implementations, can also be implemented in combination or in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A method comprising:
receiving a feedback signal in response to executing fluid flow control on a fluid flow process through a pipe system;
performing a proportional control on the feedback signal to generate a first control output, wherein the proportional control generates the first control output substantially proportional to a magnitude of the feedback signal;
performing an integral control on the feedback signal to generate a second control output, wherein the integral control generates the second control output substantially proportional to the magnitude of the feedback signal and a duration of the feedback signal;
controlling a first valve of the pipe system based on the first control output; and
controlling a second valve of the pipe system based on the second control output, wherein the second valve has a valve diameter larger than a valve diameter of the first valve.

2. The method of claim 1, wherein the proportional control on the feedback signal is performed substantially simultaneously with the integral control on the feedback signal.

3. The method of claim 1, wherein the first valve of the pipe system is controlled based on the first control output substantially simultaneously with the second valve of the pipe system based on the second control output.

4. The method of claim 1, wherein receiving the feedback signal, performing the proportional control, performing the integral control, controlling the first valve, and controlling the second valve are performed automatically by a single-input two-output (SITO) Proportional-Integral (PI) controller, wherein the SITO PI controller is configured to control the first valve and the second valve substantially simultaneously to execute the fluid flow control on the fluid flow process through the pipe system.

5. The method of claim 1, wherein performing the proportional control and controlling the first valve are performed automatically by a first single-input single-output (SISO) PI controller, and wherein performing the integral control and controlling the second valve are performed automatically by a second SISO PI controller different than the first SISO PI controller.

6. The method of claim 4, wherein the fluid flow process is a gas oil separation process (GOSP), wherein executing fluid flow control on the GOSP controls an interface level between oil and water in a dehydrator drum of the GOSP, and wherein the first valve and the second valve are air-to-close type valves controlling a water flow rate of the GOSP.

7. The method of claim 6, wherein the feedback signal is an input of the SITO PI controller representing a difference between a predetermined set point and the interface level between oil and water in the dehydrator drum of the GOSP, wherein the predetermined set point is a target value for the interface level between oil and water in the dehydrator drum of the GOSP.

8. A controller comprising:
a memory; and
a hardware processor interoperably coupled with the memory and configured to:
receive a feedback signal from a fluid flow process through a pipe system;
perform a proportional control on the feedback signal to generate a first control output, wherein the proportional control generates the first control output substantially proportional to a magnitude of the feedback signal;
perform an integral control on the feedback signal to generate a second control output, wherein the integral control generates the second control output substantially proportional to the magnitude of the feedback signal and a duration of the feedback signal;
control a first actuator of the pipe system based on the first control output; and
control a second actuator of the pipe system based on the second control output.

9. The controller of claim 8, wherein the controller is a single-input two-output (SITO) Proportional-Integral (PI) controller.

10. The controller of claim 8, wherein the controller includes a first and a second single-input single-output (SISO) PI controllers, wherein the first SISO PI controller has a first set of parameters, and the second SISO PI controller has a second set of parameters different than the first set of parameters, and wherein each set of parameters includes at least two of a proportional gain, an integral gain, or integral time.

11. The controller of claim 10, wherein the first SISO PI controller has an integral component that is disabled or has a parameter associated with integral time of the integral component that is set to a maximum allowed value in the first SISO PI controller.

12. The controller of claim 8, wherein the first actuator and the second actuator are air-to-close type valves, and wherein the second actuator has a valve diameter larger than a valve diameter of the first actuator.

13. The controller of claim 8, wherein the fluid flow process is a gas oil separation process (GOSP), the controller controls an interface level between oil and water in a dehydrator drum of the GOSP, and the first actuator and the second actuator control a water flow rate of the GOSP.

14. The controller of claim 13, wherein the feedback signal is an input of the controller representing a difference between a predetermined set point and the interface level between oil and water in the dehydrator drum of the GOSP, wherein the predetermined set point is a target value for the interface level between oil and water in the dehydrator drum of the GOSP.

15. A system comprising:
a first actuator;
a second actuator, wherein each of the first actuator and the second actuator controls an output of a fluid flow process through a pipe system; and a controller comprising a memory and a hardware processor, the hardware processor interoperably coupled with the memory and configured to:
  receive, from the fluid flow process, a feedback signal associated with the output of the fluid flow process;
  perform a proportional control on the feedback signal to generate a first control output, wherein the proportional control generates the first control output substantially proportional to a magnitude of the feedback signal;
  perform an integral control on the feedback signal to generate a second control output, wherein the integral control generates the second control output substantially proportional to the magnitude of the feedback signal and a duration of the feedback signal;
  control the first actuator based on the first control output; and
  control the second actuator based on the second control output.

16. The system of claim 15, the proportional control on the feedback signal is performed substantially simultaneously with the integral control on the feedback signal.

17. The system of claim 15, wherein the controller is a single-input two-output (SITO) Proportional-Integral (PI) controller.

18. The system of claim 15, wherein the controller includes a first single-input single-output (SISO) PI controller having a first set of parameters performing the proportional control on the feedback signal and a second SISO PI controller having a second set of parameters different than the first set of parameters performing the integral control on the feedback signal, and wherein each set of parameters includes at least two of a proportional gain, an integral gain, or integral time.

19. The system of claim 15, wherein the first actuator and the second actuator are air-to-close type valves, and wherein the second actuator has a valve diameter larger than a valve diameter of the first actuator.

20. The system of claim 15, wherein the fluid flow process is a gas oil separation process (GOSP), the controller controls an interface level between oil and water in a dehydrator drum of the GOSP, and the first actuator and the second actuator control a water flow rate of the GOSP.

21. The system of claim 20, wherein the feedback signal is an input of the controller representing a difference between a predetermined set point and the interface level between oil and water in the dehydrator drum of the GOSP, wherein the predetermined set point is a target value for the interface level between oil and water in the dehydrator drum of the GOSP.

* * * * *